(12) United States Patent
Chen et al.

(10) Patent No.: US 10,305,231 B2
(45) Date of Patent: May 28, 2019

(54) CARD CONNECTOR AND MANUFACTURING METHOD THEREOF

(71) Applicant: Microsoft Technology Licensing, LLC, Redmond, WA (US)

(72) Inventors: Chong Chen, Redmond, WA (US); Bocheng Hou, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/746,284

(22) PCT Filed: Jun. 27, 2016

(86) PCT No.: PCT/US2016/039477
§ 371 (c)(1),
(2) Date: Jan. 19, 2018

(87) PCT Pub. No.: WO2017/014917
PCT Pub. Date: Jan. 26, 2017

(65) Prior Publication Data
US 2018/0219335 A1 Aug. 2, 2018

(30) Foreign Application Priority Data
Jul. 20, 2015 (CN) .......................... 2015 1 0428968

(51) Int. Cl.
*H04M 1/02* (2006.01)
*H01R 12/91* (2011.01)
(Continued)

(52) U.S. Cl.
CPC ....... *H01R 13/7031* (2013.01); *H01R 12/714* (2013.01); *H01R 12/91* (2013.01);
(Continued)

(58) Field of Classification Search
CPC .... H01R 12/71; H01R 12/72; H01R 12/7076; H01R 13/6581; H01R 13/6591; H04B 1/3818
See application file for complete search history.

(56) References Cited

U.S. PATENT DOCUMENTS 6,805,570 B1 * 10/2004 Lee ...................... G06K 7/0082
439/108
8,100,722 B2 1/2012 Hu et al.
(Continued)

FOREIGN PATENT DOCUMENTS

| CN | 1119355 A | 3/1996 |
| CN | 2862425 Y | 1/2007 |

(Continued)

OTHER PUBLICATIONS

"International Preliminary Report on Patentability Issued in PCT Application No. PCT/US2016/039477", dated Jul. 24, 2017, 8 Pages.

(Continued)

*Primary Examiner* — Simon Nguyen
(74) *Attorney, Agent, or Firm* — Arent Fox LLP

(57) ABSTRACT

A card connector and a method of manufacturing the card connector are provided. In one embodiment, the card connector comprises a base; a shielding sleeve connected to the base, the base and the shielding sleeve defining a first direction for inserting a card and a second direction opposite to the first direction for extracting the card; and a shielding tray for receiving the card, the shielding tray being movable relative to the base in the first direction or the second direction, wherein the card connector is operable to electrically connect to the card if the card reaches a position of insertion along the first direction. The card connector is capable of facilitating the push-in and pull-out operations of (Continued)

a card by a user, while minimizing an exposed area of the card so as to improve the shielding performance.

15 Claims, 6 Drawing Sheets

(51) Int. Cl.
*H04B 1/3818* (2015.01)
*H01R 13/6581* (2011.01)
*H01R 13/6591* (2011.01)
*H01R 12/71* (2011.01)
*H01R 13/703* (2006.01)
*H01R 13/24* (2006.01)
*H01R 13/648* (2006.01)

(52) U.S. Cl.
CPC ..... *H01R 13/6581* (2013.01); *H01R 13/6591* (2013.01); *H04B 1/3818* (2015.01); *H04M 1/0274* (2013.01); *H01R 13/24* (2013.01); *H01R 13/6485* (2013.01)

(56) References Cited

U.S. PATENT DOCUMENTS

| | | | |
|---|---|---|---|
| 8,371,866 B1 | 2/2013 | Su et al. | |
| 8,376,764 B1* | 2/2013 | Su | G06K 13/0831 |
| | | | 439/157 |
| 8,439,706 B2 | 5/2013 | Sytsma et al. | |
| 8,460,021 B1 | 6/2013 | Lee et al. | |
| 8,500,471 B1 | 8/2013 | Chan et al. | |
| 8,579,640 B2* | 11/2013 | Ho | H01R 13/6271 |
| | | | 439/159 |
| 8,616,920 B2 | 12/2013 | Pauley et al. | |
| 8,740,648 B2 | 6/2014 | Zhang | |
| 8,814,582 B2 | 8/2014 | Lee et al. | |
| 9,001,501 B2 | 4/2015 | Takasaki et al. | |
| 9,077,109 B1 | 7/2015 | Lin et al. | |
| 2007/0249199 A1* | 10/2007 | Takei | G06K 7/0021 |
| | | | 439/159 |
| 2009/0124126 A1 | 5/2009 | Cho et al. | |
| 2009/0267677 A1 | 10/2009 | Myers et al. | |
| 2012/0276780 A1* | 11/2012 | Hu | H01R 12/714 |
| | | | 439/630 |
| 2014/0017920 A1* | 1/2014 | Takasaki | H01R 12/721 |
| | | | 439/157 |
| 2015/0022981 A1 | 1/2015 | Tan et al. | |
| 2015/0056851 A1* | 2/2015 | Zhang | H04B 1/3816 |
| | | | 439/527 |
| 2015/0162681 A1* | 6/2015 | Chen | G06K 13/0831 |
| | | | 439/153 |
| 2015/0263452 A1* | 9/2015 | Zhang | H01R 13/62 |
| | | | 439/153 |
| 2015/0333444 A1* | 11/2015 | Wang | H01R 13/633 |
| | | | 439/159 |
| 2016/0248184 A1* | 8/2016 | Motohashi | G06K 7/0056 |
| 2016/0261068 A1* | 9/2016 | Nagase | H01R 12/722 |
| 2017/0250481 A1* | 8/2017 | Zhu | H01R 12/71 |

FOREIGN PATENT DOCUMENTS

| | | |
|---|---|---|
| CN | 201146262 Y | 11/2008 |
| CN | 202564731 U | 11/2012 |
| CN | 203326283 U | 12/2013 |
| CN | 103943985 A | 7/2014 |
| CN | 203747073 U | 7/2014 |
| CN | 104600508 A | 5/2015 |
| EP | 1847943 A1 | 10/2007 |

OTHER PUBLICATIONS

"International Search Report and Written Opinion Issued in PCT Application No. PCT/US2016/039477", dated Sep. 14, 2016, 12 Pages.

"Micro-Sim Card Sockets, Push-Pull Style, 6- and 8-Circuit,1.40 and 1.45mm Height, Halogen-Free, Lead-Free", Retrieved from <<https://web.archive.org/web/20150511065421/http://www.mouser.com/pdfdocs/molexmicrosimcardsockets.pdf>>, May 11, 2015, 5 Pages.

"First Office Action Issued and Search Report in Chinese Patent Application No. 201510428968.9", dated Oct. 22, 2018, 10 Pages.

* cited by examiner

CARD CONNECTOR AND MANUFACTURING METHOD THEREOF

CROSS-REFERENCE TO REPLATED APPLICATIONS

This application is a National Stage entry of International Application No.: PCT/US2016/039477, filed Jun. 27, 2016, which claims priority to Chinese Patent Application No. 201510428968.9, filed Jul. 20, 2015. The disclosure of the priority applications are hereby incorporated in their entirety by reference.

BACKGROUND

A card connector may be used in an electronic device to receive a storage card or a subscriber identity module (SIM) card so as to read the information recorded in the card. For example, a typical mobile device may include at least one card connector allowing a user inserting a SIM card into the mobile device or extracting the SIM card out of the mobile device.

SUMMARY

Example embodiments of the subject matter described herein proposes a card connector and a manufacturing method thereof.

In one aspect, example embodiments of the subject matter described herein provide a card connector. The card connector includes a base and a shielding sleeve connected to the base, the base and the shielding sleeve defining a first direction for inserting a card and a second direction opposite to the first direction for extracting the card. The card connector also includes a shielding tray for receiving the card, the shielding tray being movable relative to the base in the first direction or the second direction, wherein the card connector is operable to electrically connect to the card if the card reaches a position of insertion along the first direction.

In another aspect, example embodiments of the subject matter described herein provide a method of manufacturing a card connector. The method includes providing a base and a shielding sleeve connected to the base, the base and the shielding sleeve defining a first direction for inserting a card and a second direction opposite to the first direction for extracting the card. The method also includes providing a shielding tray for receiving the card, the shielding tray being movable relative to the base in the first direction or the second direction, wherein the card connector is operable to electrically connect to the card if the card reaches a position of insertion along the first direction.

In another aspect, example embodiments of the subject matter described herein provide a wireless communication device. The wireless communication device includes a substrate and a card connector in accordance with the card connector described previously. The card connector is mounted to the substrate in order to form data and power transmissions between the card and the wireless communication device, and the card is a SIM card.

Through the following description, it would be appreciated that the card connector in accordance with the embodiments of the subject matter described herein is capable of providing a larger operational space in order to facilitate the push-in and pull-out operations of a card by a user, while minimizing an exposed area of the card during data/power transmissions so as to improve the shielding performance in terms of anti-interference.

DETAILED DESCRIPTION

Figure 1:
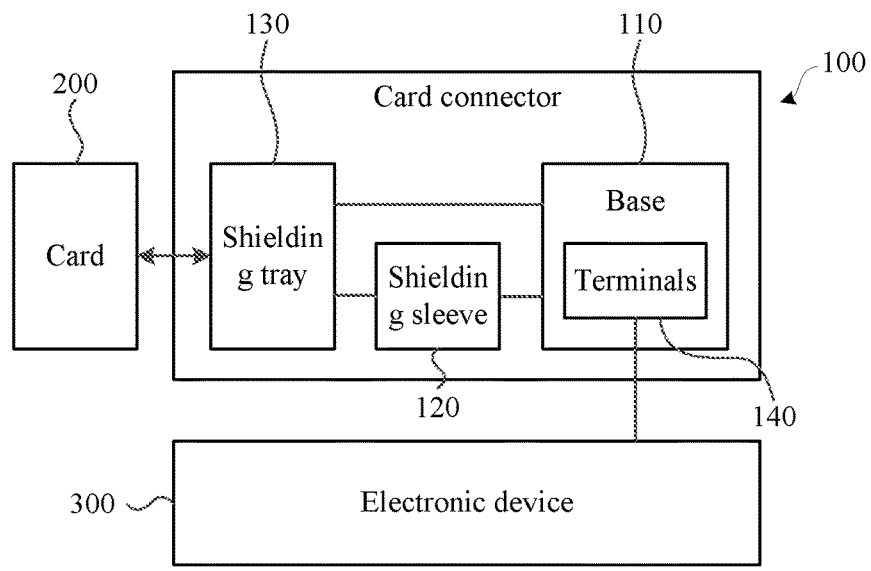
FIG. 1 illustrate a block diagram of a card connector according to one embodiment of the subject matter described herein.

The subject matter described herein will now be discussed with reference to several example embodiments. These embodiments are discussed only for the purpose of enabling those skilled persons in the art to better understand and thus implement the subject matter described herein, rather than suggesting any limitations on the scope of the subject matter.

The term "includes" and its variants are to be read as opened terms that mean "includes, but is not limited to." The term "or" is to be read as "and/or" unless the context clearly indicates otherwise. The term "based on" is to be read as "based at least in part on." The term "one embodiment" and "an embodiment" are to be read as "at least one embodiment." The term "another embodiment" is to be read as "at least one other embodiment." Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In the description below, like reference numerals and labels are used to describe the same, similar or corresponding parts in the several views of FIGS. 1-16. Other definitions, explicit and implicit, may be included below.

A card connector may be implemented as a component within an electronic device. For example, card connectors are widely used in mobile phones in order to receive and hold SIM cards so that information associated with the SIM card can be read by the mobile phones. In some instances, the card connector requires a push motion onto the card so that the card, when pushed to the end, will be in an electrical connection with the electronic device. However, such an arrangement of the card connector may require the end user to move the card out of the card connector in a direction opposite to its insertion. Due to the smaller and smaller size of cards such as SIM cards, Micro-SIM cards and Nano-SIM cards, the operational space for the card is reduced significantly and thus it becomes more and more difficult for the users to pull/extract the card out of the device. In addition, in order to facilitate the pull-out motion of the card, a considerable portion of its surface area may need to be exposed for being accessible. Meanwhile, this may pose a problem because the reduced area of shielding also negatively affects the performance in terms of anti-interference.

FIG. 1 illustrates a block diagram of a card connector 100 according to one embodiment of the subject matter described herein. The card connector 100 is described only for the purpose of illustration without suggesting any limitations as to the scope of the subject matter described herein. Different embodiments with different structures can realize the purpose and concept of the subject matter described herein.

As shown, the card connector 100 includes a base 110 and a shielding sleeve 120 connected to the base 110. The base 110 and the shielding sleeve 120 define a first direction for inserting a card 200 and a second direction opposite to the first direction for extracting the card 200. A shielding tray 130 is provided for receiving and holding the card. The shielding tray 130 is movable relative to the base 110 either in the first direction or in the second direction. The movement of the shielding tray 130 may be confined by both the base 110 and the shielding sleeve 120.

The card connector 100 further includes a number of terminals 140 in order to form an electrical connection to an electronic device 300. Such an electrical connection may be used for data and power transmissions. The electrical connection may be made only when the card 200 is fully or substantially received in the shielding tray 130 and the shielding tray 130 is fully or substantially inserted at the position of insertion.

In this configuration, the shielding tray 130 is movable relative to the base 110 between a position of extraction and an position of insertion. As a result, two configurations of the card connector 100 are provided, with a first configuration positioning the shielding tray 130 at the position of extraction and a second configuration positioning the shielding tray 130 at the position of insertion. The first configuration allows a larger operational space for the end user so that the card 200 can be removed easily from the card connector 100. The second configuration allows more area of the card 200 being covered by both the shielding tray 130 as well as the shielding sleeve 120, resulting in an improved anti-interference during data/power transmission.

Figure 2:
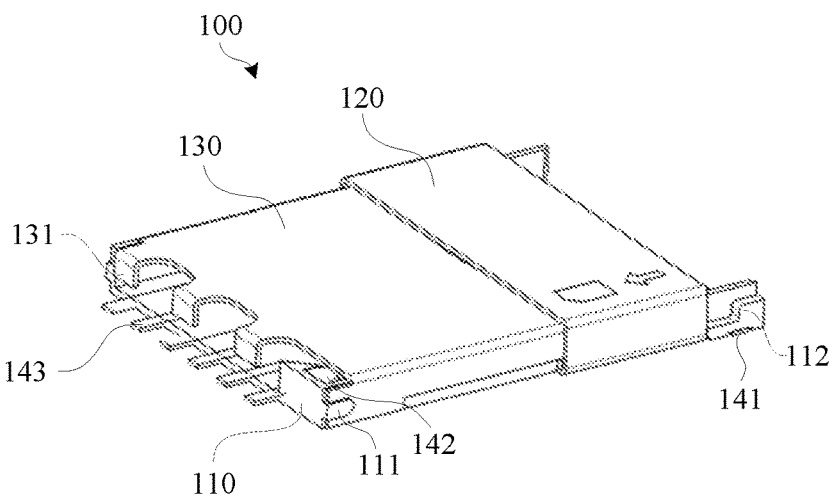
FIG. 2 illustrates a perspective view of a card connector according to one embodiment of the subject matter described herein.

With reference to FIG. 2, a perspective view of an implementation of the card connector 100 according to one embodiment of the subject matter described herein is shown. In this implementation, the shielding sleeve 120 may be fixedly connected to the base 110. The shielding sleeve 120 may be made of electrically conductive materials such as stainless steel and copper, or may be made of any suitable material plated with electrically conductive materials. The base 110 may be made of insulating materials such as PC/ABS. The shielding tray 130 may be sandwiched between the shielding sleeve 120 and the base 110 and movable between a position of extraction and an position of insertion in a route confined by the shielding sleeve 120 and the base 110.

As shown in FIG. 2, the shielding tray 130 is positioned at the position of insertion while the card is absent in the shielding tray 130. In one embodiment, an inserting stopper 111 may be provided on the base 110 in the form of a protruding feature so as to stop any further movement of the shielding tray 130 in the first direction. There may be a corresponding feature formed on the shielding tray 130 in order to match the shape of inserting stopper 111, as illustrated by FIG. 2. Alternatively, such a corresponding feature may not be provided on the shielding tray 130, once the inserting stopper 111 is able to prevent the shielding tray 130 located at the position of insertion from further moving in the first direction. The shape, size, position, and form of the inserting stopper 111 is not to be limited.

On the other hand, an extracting stopper 112 may be provided on the base 110 in the form of a protruding feature so as to stop any further movement of the shielding tray 130 in the second direction. There may be a corresponding feature formed on the shielding tray 130 in order to match the shape of extracting stopper 112, as illustrated by FIG. 2. Alternatively, such a corresponding feature may not be provided on the shielding tray 130, once the extracting stopper 112 is able to prevent the shielding tray 130 located at the position of extraction from further moving in the second direction. The shape, size, position, or form of the extracting stopper 112 is also not to be limited.

As shown, the shielding tray 130 further includes a finger-shaped portion 131 to stop any further movement of the card relative to the shielding tray 130 in the first direction once the card is in contact with the finger-shaped portion 131, namely, has been inserted to the end of the shielding tray 130. There may be provided with several fingers or only one finger for the finger-shaped portion 131 (three fingers are shown in FIG. 2).

As the user may operate the card connector 100 blindly or in a dark environment, the inserting stopper 111, the finger-shaped portion 131 and the extracting stopper 112 provide with an intuitive operation for the user to move or slide the shielding tray 130 from the position of extraction to the position of insertion, or from the position of insertion to the position of extraction. The card will be deepest into the card connector 100 if the shielding tray 130 collides with the inserting stopper 111 while the card collides with the finger-shaped portion 131, meaning that the card is ready for data/power transmission with the electronic device. Also, the card will expose its largest surface area if the shielding tray 130 collides with the extracting stopper 112 indicating that the card is ready to be grasped by a user.

A number of connection terminals 143 may be provided on the base 110 for forming an electrical connection between the card and the electronic device (not shown). The position or number of the connection terminal 143 is not to be limited, although FIG. 2 illustrates six connection terminals 143 positioned at an end close to the inserting stopper 111.

A detection contact 142 and a detection terminal 141 may be provided on the base 110 for detecting whether the shielding tray 130 is at the position of insertion. The detection terminal 141 is used to form an electrical connection with the electronic device (not shown), while the detection contact 142 is electrically connected to the detection terminal 141. For example, the detection contact 142 and the detection terminal 141 may be integrally formed from a single metal piece, or separately formed with a wire connected therebetween. If the shielding tray 130 is moved to the position of insertion, it will contact the detection contact 142, and thus the detection terminal 141 is electrically connected to the shielding tray 130, and further to the shielding sleeve 120 and finally to another terminal in order to complete a loop, such that the insertion of the shielding tray 130 is detected. This process will be described with reference to further figures in the followings.

Figure 3:
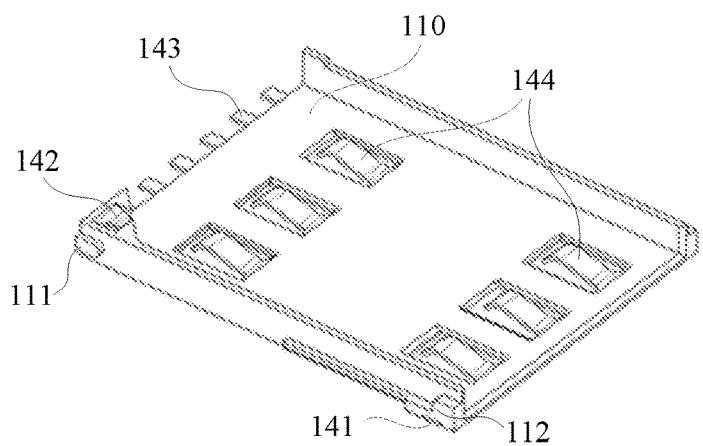
FIG. 3 illustrates a perspective view of a card connector with a shielding tray and a shielding sleeve removed according to one embodiment of the subject matter described herein.

FIG. 3 illustrates a perspective view of a card connector 100 with a shielding tray 130 and a shielding sleeve 120 removed according to one embodiment of the subject matter described herein.

As shown, connection contacts 144 and connection terminals 143 may be provided on the base 110 for forming an electrical connection between the inserted card and the electronic device, allowing data and power transmission therebetween. The connection terminals 143 are used to form an electrical connection with the electronic device (not shown) while the connection contacts 144 are used to form an electrical connection with the card (not shown). Each of the connection terminals 143 may correspond to one of the connection contacts 144. For example, one of the connection contacts 144 and its corresponding connection terminal 143 may be integrally formed from a single metal piece, or separately formed with a wire connected therebetween. The connection contacts 144 may be elastically deformable upon the insertion of the card so as to contact the corresponding terminals on the card (not shown). However, the form of contact between the card and the connection contacts 144 is not limited.

Figure 4:
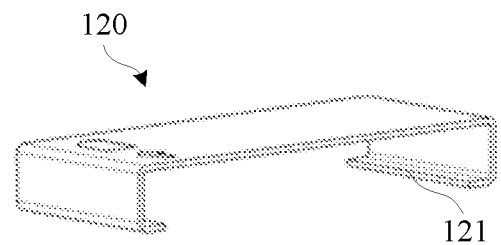
FIG. 4 illustrates a perspective view of the shielding sleeve according to one embodiment of the subject matter described herein.

With reference to FIG. 4, a perspective view of the shielding sleeve 120 according to one embodiment of the subject matter described herein is shown. A grounding terminal 121 may be provided on the shielding sleeve 120 for forming an electrical connection with the electronic device. As discussed above, if the shielding tray 130 is moved to the position of insertion, it will contact the detection contact 142, and thus the detection terminal 141 is electrically connected to the shielding tray 130, and further to the shielding sleeve 120 and finally to the grounding terminal 121 in order to complete the loop. By using this route, in one embodiment, the electronic device may trigger a signal at one of the grounding terminal 121 and the detection terminal 141, and receive the signal at the other one of the grounding terminal 121 and the detection terminal 141 once the shielding tray 130 is in contact with the detection contact 142.

In one embodiment, the shielding sleeve 120 is entirely made of electrically conductive materials such as stainless steel and copper. Alternatively, the shielding sleeve 120 may be made of other material but plated with electrically conductive materials. In such a case, the surface of the shielding sleeve 120 does not need to be plated entirely as long as the plated pattern is able to form an electrical connection between the shielding tray 130 and the electronic device.

Figure 5:
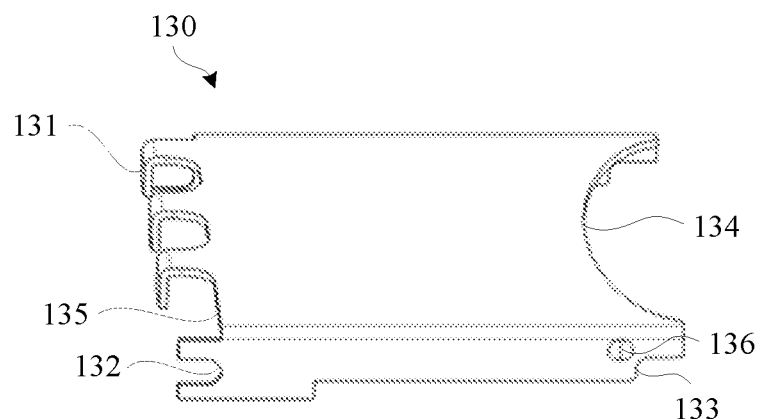
FIG. 5 illustrates a perspective view of the shielding tray according to one embodiment of the subject matter described herein.

With reference to FIG. 5, a perspective view of the shielding tray 130 according to one embodiment of the subject matter described herein is shown. An inserting feature 132 may be formed on the shielding tray 130 so as to mate with the inserting stopper 111 shown in FIGS. 2 and 3. Because of the inserting feature 132, the shielding tray 130 being moved in the first direction is stopped by the inserting stopper 111. On the other hand, an extracting feature 133 may be formed on the shielding tray 130 so as to mate with the extracting stopper 112 shown in FIGS. 2 and 3. Because of the extracting feature 133, the shielding tray 130 being moved in the second direction is stopped by the extracting stopper 112.

As discussed above, the finger-shaped portion 131 may be formed at one end close to the inserting feature 132 of the shielding tray 130. An indented portion 135 may also be provided at this end of the shielding tray 130 in order to facilitate the movement of the card relative to the shielding tray 130 or the finger-shaped portion 131 of the shielding tray 130 in the second direction by a force applied onto the card. If the card is currently in contact with the finger-shaped portion 131 and the user would like to pull out the card, the user may firstly move the shielding tray 130 in the second direction until it collides with the extracting stopper 112. Then, the user may further push the portion of the card exposed by the indented portion 135 and thus the card would be moved for a distance further in the second direction. Therefore, the configurations of the finger-shaped portion 131 and the indented portion 135 allow a larger space for operation when the user intends to remove the card from the card connector 100.

An arc portion 134 may be formed on the shielding tray 130 at an end opposite to the end where the finger-shaped portion 131 locates. The arc portion 134 allows for a further exposed area of the card when the shielding tray 130 is at the position of extraction so as to facilitate the manual extraction of the card. Furthermore, the arc portion 134 may be covered by the shielding sleeve 120 when the shielding tray 130 is at the position of insertion. This ensures the performance of anti-interference, as discussed previously, as the card is fully inserted into the card connector 100.

In one embodiment, surfaces of the shielding tray 130 and the shielding sleeve 120 are electrically conductive, and the shielding tray 130 may further comprise a protrusion 136 for forming an electrical connection between the shielding tray 130 and the shielding sleeve 120 in response to the shielding tray 130 reaching the position of insertion. The protrusion 136 may form a slidable connection with the shielding sleeve 120. In this manner, the protrusion 136 will be in contact with the shielding sleeve 120 whenever the shielding tray 130 is positioned in between the position of insertion and the position of extraction. Alternatively, the protrusion 136 is in contact with the shielding sleeve 120 only if the shielding tray 130 is at the position of insertion.

In one other embodiment, the protrusion 136 may be provided on the shielding sleeve 120 for forming an electrical connection between the shielding tray 130 and the shielding sleeve 120 in response to the shielding tray 130 reaching the position of insertion. The protrusion 136 may form a slidable connection with the shielding sleeve 120, meaning that the protrusion 136 will be in contact with the shielding tray 130 wherever the shielding tray 130 is positioned from the position of insertion to the position of extraction. Alternatively, the protrusion 136 is in contact with the shielding tray 130 only if the shielding tray 130 is at the position of insertion.

In one embodiment, the shielding tray 130 is entirely made of electrically conductive materials such as stainless steel and copper. Alternatively, the shielding tray 130 may be made of other material but plated with electrically conductive materials. In such a case, the surface of the shielding tray 130 does not need to be plated entirely as long as the plated pattern is able to form an electrical connection between the shielding sleeve 120 (or the protrusion 136) and the detection contact 142.

Figure 6:
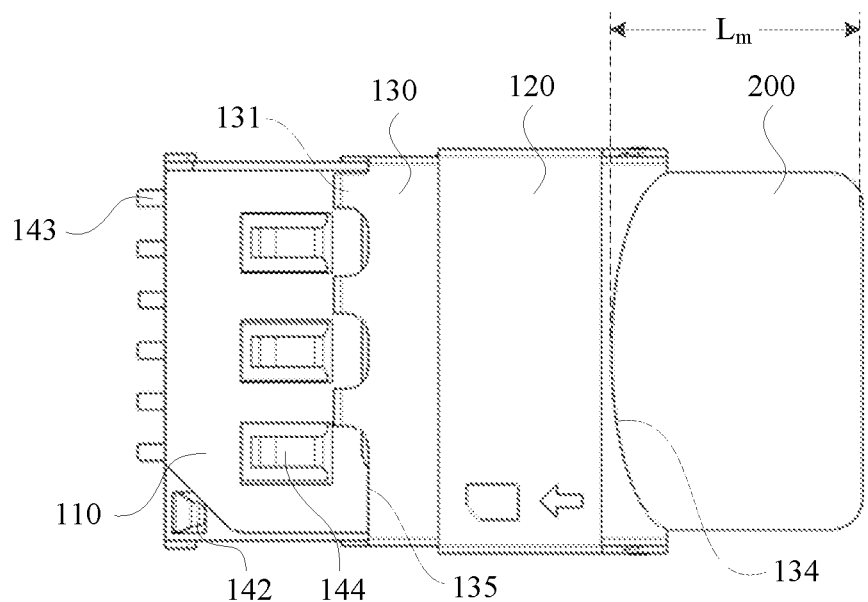
FIG. 6 illustrates a top view of a card connector when a card is about to be inserted into the shielding tray according to one embodiment of the subject matter described herein.
Figure 7:
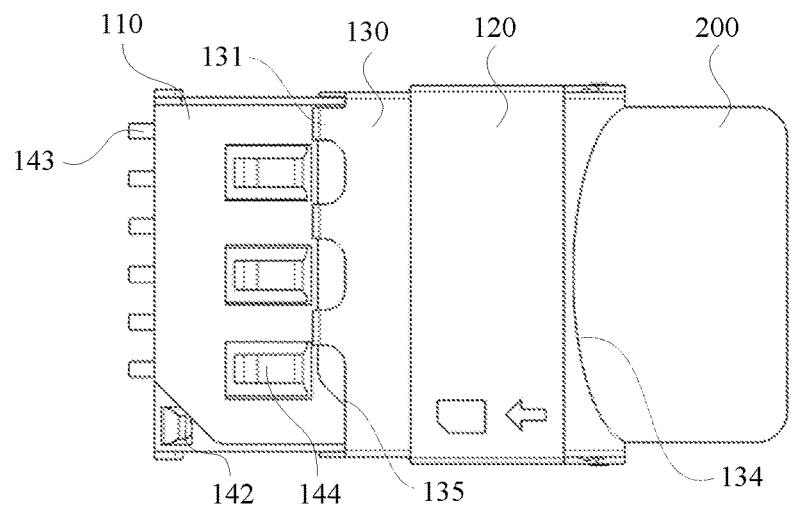
FIG. 7 illustrates a top view of a card connector when a card has been inserted into the shielding tray according to one embodiment of the subject matter described herein.
Figure 8:
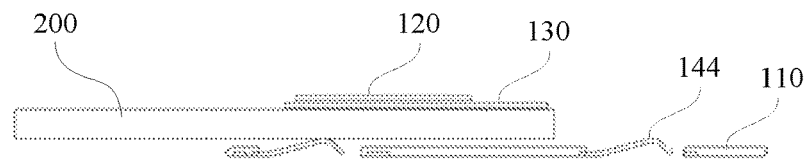
FIG. 8 illustrates a side sectional view of a card connector of FIG. 7, in which the card has been inserted into the shielding tray.

FIGS. 6, 7, 9 and 10 illustrate a process of a card 200 being inserted into the card connector 100 (or a process of a card 200 being extracted out of the card connector 100, in a reversed order) according to one embodiment of the subject matter described herein, and FIG. 8 illustrates a side sectional view of a card connector of FIG. 7, in which the card has been inserted into the shielding tray. The configurations and functionalities of parts and components denoted by numeral references in these figures are already explained with reference to FIGS. 2 through 5, and thus detailed descriptions will be omitted.

A typical process of card insertion according to one embodiment of the subject matter described herein will now be given with reference to FIGS. 6 to 10 in the following paragraphs.

As shown in FIG. 6, the shielding tray 130 is at the position of extraction, and a card 200 is being inserted in the first direction into the shielding tray 130. However, the shielding tray 130 may be located at locations other than the position of extraction for receiving the card 200. The location of the shielding tray 130 may depart from the position of extraction to a certain extent and the insertion of the card 200 will not be affected.

In FIG. 7, the card 200 has been fully pushed into the shielding tray 130, with the card 200 colliding with the finger-shaped portion 131 of the shielding tray 130. However, in this particular example, the shielding tray 130 has not been moved in the first direction yet.

In FIG. 8, as observed from a side sectional view, the card 200 is sandwiched between the shielding tray 130 and the base 110, and the shielding tray 130 is slidable together with the card 200 contained therein back and forth as defined by the shielding sleeve 120 and the base 110.

Figure 9:
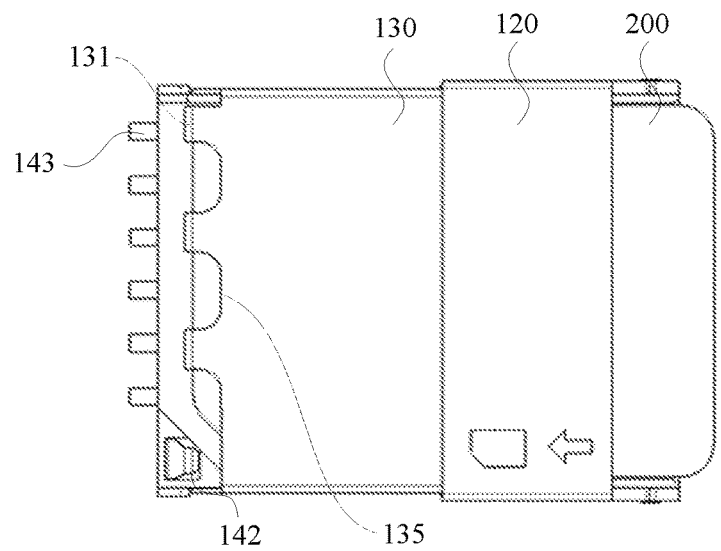
FIG. 9 illustrates a top view of a card connector when a card has been inserted into the shielding tray and the shielding tray is being moved halfway between a position of extraction to an position of insertion according to one embodiment of the subject matter described herein.

In FIG. 9, a moment is shown as the user keeps pushing the card 200 in the first direction and the card 200 in turns push the finger-shaped portion 131 to further move the shielding tray 130 in the first direction.

Figure 10:
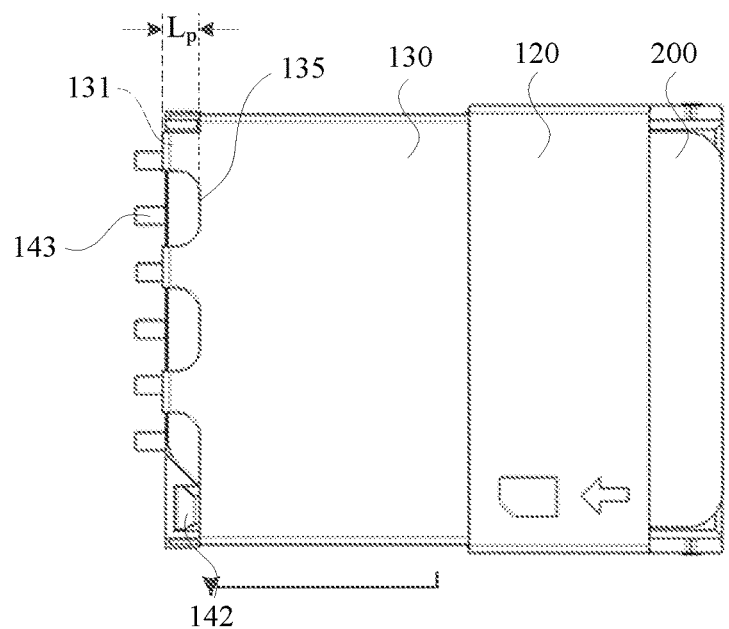
FIG. 10 illustrates a top view of a card connector when a card has been inserted into the shielding tray and the shielding tray has been positioned at the position of insertion according to one embodiment of the subject matter described herein.

In FIG. 10, the shielding tray 130 has been pushed to the position of insertion and the detection contact 142 is in contact with the shielding tray 130. At this configuration, the card 200 forms an electrical connection to the electronic device and thus the data/power transmission is enabled. Also, the card 200 being fully inserted to the card connector 100 can be detected by the detection contact 142 connected to the shielding tray 130. With the insertion detected, the card may be operated with higher security and safety. In addition, it is shown in FIG. 10 that most area of the card 200 is covered by the shielding tray 130 as well as the shielding sleeve 120, so that the anti-inference can be guaranteed during data/power transmission.

A typical process of card extraction according to one embodiment of the subject matter described herein will now be given with reference to FIGS. 6, 7, 9 and 10 in the following paragraphs.

In FIG. 9, a moment is shown as the user moves the shielding tray 130 in the second direction. For example, the user may apply force onto the finger-shaped portion 131 of the shielding tray 130 in order to move the shielding tray 130 including the card 200 therein.

In FIG. 7, the shielding tray 130 has been moved to the position of extraction, exposing a significant portion of the card 200 thanks to the arc portion 134 on the shielding tray 130.

In FIG. 6, the user further apply force onto the card 200 through the indented portion 135, resulting in the card 200 being extracted out of the shielding tray 130 in the second direction for an additional amount $L_p$ (as shown in FIG. 10). $L_p$ is defined by a distance between the finger-shaped portion 131 and the indented portion 135 along the first direction or second direction. As a result, the exposed length of the card 200 for user's grasp can be about 50% of the entire length (shown by $L_m$ of FIG. 6) of the card 200. This configuration allows the user to remove the card 200 by hand in an easy manner.

In the configuration as shown in FIG. 10, most surface of the card 200 is covered by the shielding sleeve 120 and the shielding tray 130 so as to be protected from interference such as electromagnetic wave. A larger area of shielded surface on the card normally achieves a better anti-interference. Due to limitations on ergonomics, however, a card inserted into a conventional card connector may leave a significant portion of its surface area to be exposed in order to let a user easily grasp the card, while the anti-interference is compromised.

The embodiments of the subject matter described herein allow most of the surface area of the card to be shielded, as shown in FIG. 10, in case that the card 200 is in contact with the finger-shaped portion 131 and the shielding tray 130 is at the position of insertion. A predetermined percentage of the surface area of the card 200 may be covered by the shielding tray 130 and the shielding sleeve 120. In one example, the predetermined percentage is at least 75%. In the particular example shown in FIG. 10, the predetermined percentage can be about 85% or more. On the other hand, if the shielding tray 130 reaches the position of extraction and the card 200 is pushed to be flush with the indented portion 135, as shown in FIG. 6, a relatively large portion of the surface area of the card 200 is exposed, allowing the card 200 to be removed easily from the card connector 100.

Figure 11:
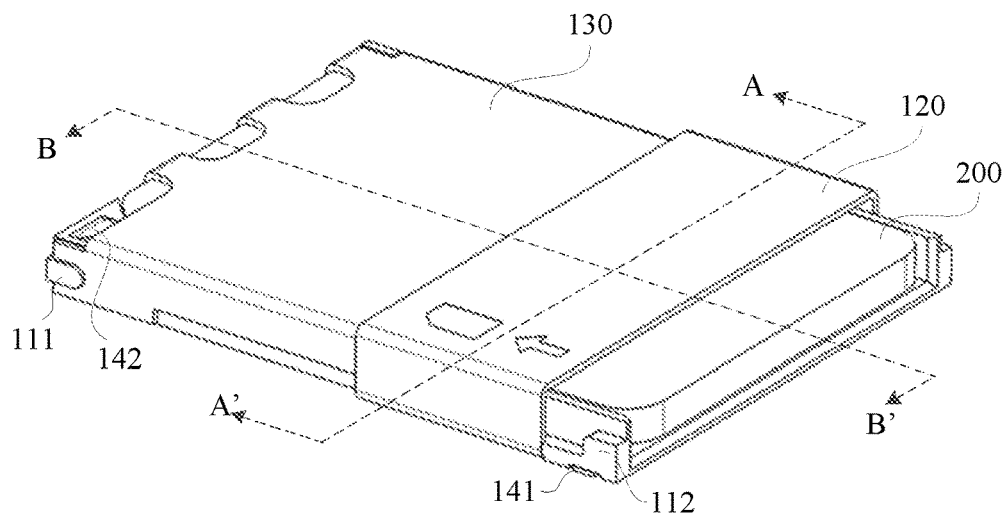
FIG. 11 illustrates a perspective view of the card connector with the card inserted in the shielding tray and the shielding tray pushed to the position of insertion according to one embodiment of the subject matter described herein.
Figure 12:
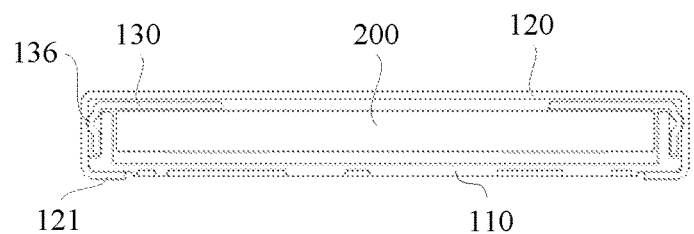
FIG. 12 illustrates a sectional view of the card connector seen in A-A' of FIG. 11 with the card inserted in the shielding tray and the shielding tray pushed to the position of insertion according to one embodiment of the subject matter described herein.
Figure 13:
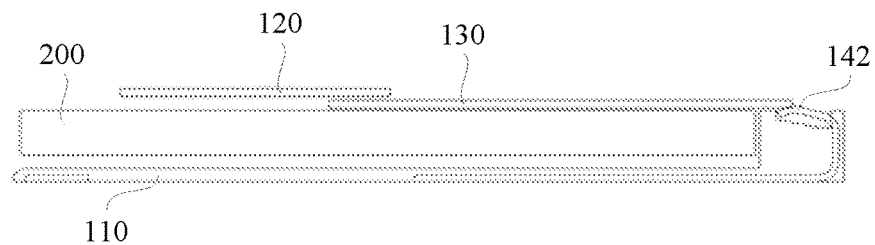
FIG. 13 illustrates a sectional view of the card connector seen in B-B' of FIG. 11 with the card inserted in the shielding tray and the shielding tray pushed to the position of insertion according to one embodiment of the subject matter described herein.

With reference to FIG. 11, a perspective view of the card connector 100 with the card 200 inserted in the shielding tray 130 and the shielding tray 130 pushed to the position of insertion according to one embodiment of the subject matter described herein is shown. FIG. 12 illustrates a sectional view of the card connector 100 seen in A-A' of FIG. 11 with the shielding tray 130 pushed to the position of insertion, and FIG. 13 illustrates a sectional view of the card connector 100 seen in B-B' of FIG. 11 with the shielding tray 130 pushed to the position of insertion. As seen in FIGS. 12 and 13, the protrusion 136 on the shielding tray 130 is in contact with the shielding sleeve 120 and the detection contact 142 is in contact with the shielding tray 130, as described above, so as to facilitate the detection of the card 200 being fully inserted into the card connector 100.

Figure 14:
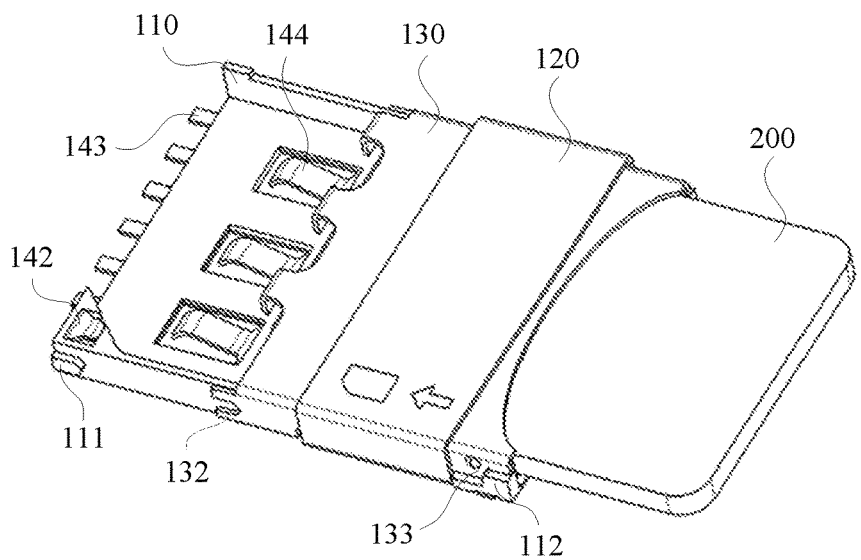
FIG. 14 illustrates a perspective view of the card connector with the card being pulled out of the shielding tray and the shielding tray being at the position of extraction according to one embodiment of the subject matter described herein.

With reference to FIG. 14, a perspective view of the card connector 100 with the card 200 being pulled out of the shielding tray 130 and the shielding tray 130 being at the position of extraction according to one embodiment of the subject matter described herein is shown. The shielding tray 130 is stuck by the extracting stopper 112, so that the movement of the shielding tray 130 in the second direction is limited.

Figure 15:
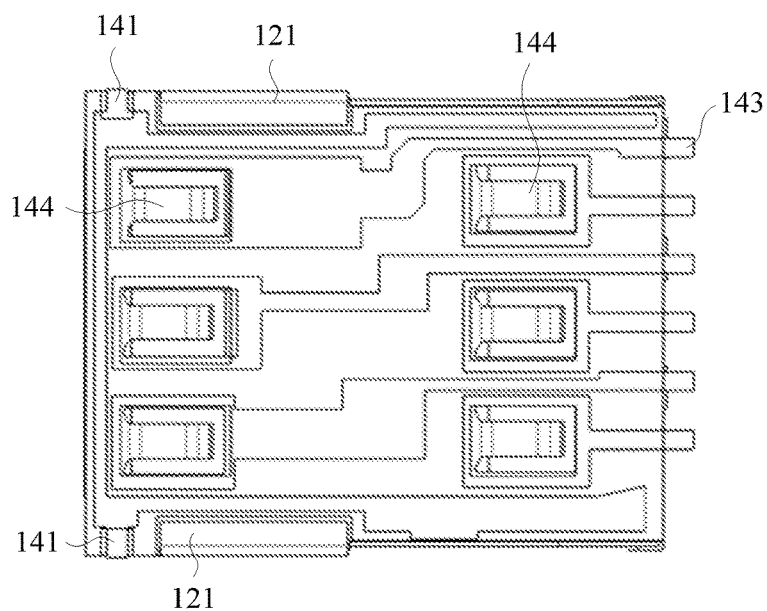
FIG. 15 illustrates a bottom view of the card connector according to one embodiment of the subject matter described herein.

With reference to FIG. 15, a bottom view of the card connector 100 according to one embodiment of the subject matter described herein is shown. The number, route, pattern and arrangement of the connection contacts 144, grounding terminals 121, connection terminals 143, and detection terminals 141 are not to be limited.

The above examples are described only for the purpose of illustration, without suggesting any limitations as to the scope of the subject matter described herein. Any additional or alternative materials can be used to make the components of the switch.

It is to be understood that "top", "bottom", "front", "rear", "side", "lateral" and the like are only used to describe the relationship between the components in the figures, instead of limiting their orientation or positioning. For example, in FIG. 2, the shielding sleeve 120 can be seen as being placed above the base 110, and can also be seen as being placed underneath the base 110. In addition, although the connection contacts 144 and the grounding contacts 121 as shown by FIG. 15 is placed at the bottom of the card connector 100, it can be understood that the contacts placed aside the card connector 100 may also work.

Figure 16:
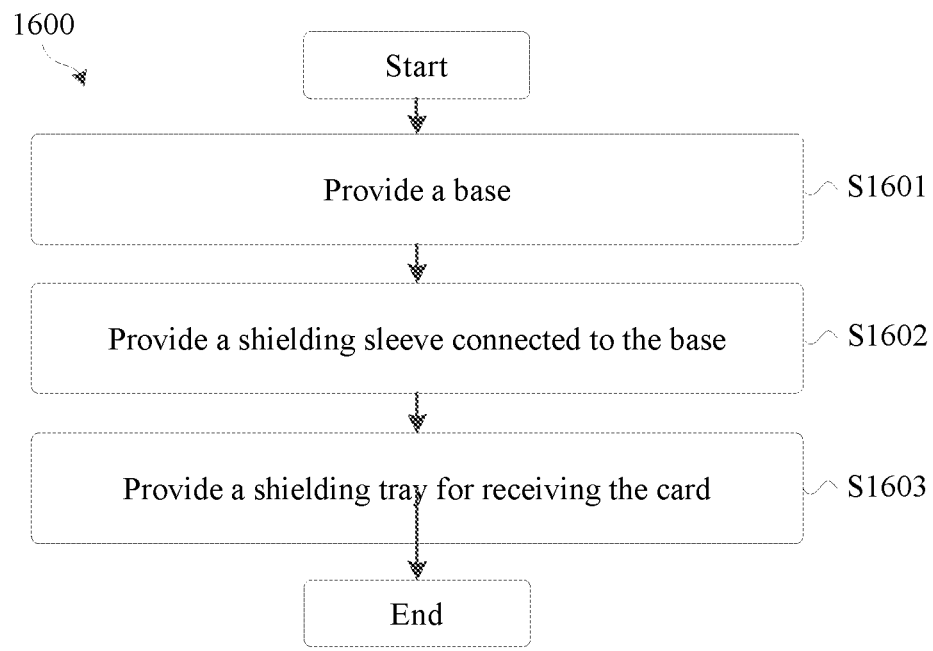
FIG. 16 illustrates a flowchart of a method of manufacturing the switch in accordance with embodiments of the subject matter described herein.

With reference to FIG. 16, it illustrates a block diagram of a method 1600 of manufacturing the card connector 100 in accordance with embodiments of the subject matter described herein. The method 1600 is entered at step S1601, where a base is provided.

At step S1602, a shielding sleeve connected to the base is provided. The base and the shielding sleeve define a first direction for inserting a card and a second direction opposite to the first direction for extracting the card.

At step S1603, a shielding tray for receiving the card is provided. The shielding tray is movable relative to the base in the first direction or in the second direction. The card connector being operable to electrically connect the card to an electronic device in response to the shielding tray that receives the card being inserted to an position of insertion along the first direction.

In one embodiment, the method may further comprise providing the shielding sleeve and the shielding tray covering at least a predetermined percentage of a surface area of the card in response to the card being received in the shielding tray and the shielding tray being at the position of insertion.

In another embodiment, the method may further comprise providing an inserting stopper arranged on the base and operable to prevent the shielding tray at the position of insertion from further moving in the first direction.

In yet another embodiment, the method may further comprise providing an extracting stopper arranged on the base and operable to prevent the shielding tray at a position of extraction from further moving in the second direction.

In still another embodiment, the method may further comprise providing a finger-shaped portion arranged on the shielding tray and operable to prevent the card from further moving in the first direction in response to the shielding tray reaching the position of insertion.

Additionally or alternatively, the method may further comprise providing an indented portion arranged on the shielding tray and operable to facilitate a movement of the card relative to the shielding tray in the second direction, the movement of the card being caused by a force applied on the card.

In one embodiment, the method may further comprise providing a detection contact arranged on the base; and providing a grounding terminal arranged on the shielding sleeve and electrically connected to the electronic device, the detection contact being operable to electrically connect to the grounding terminal in response to the shielding tray reaching the position of insertion.

Additionally or alternatively, the method may further comprise providing a detection terminal arranged on the base and electrically connected to the detection contact, such that the grounding terminal is operably connected to the detection terminal in response to the shielding tray reaching the position of insertion.

Figure 17:
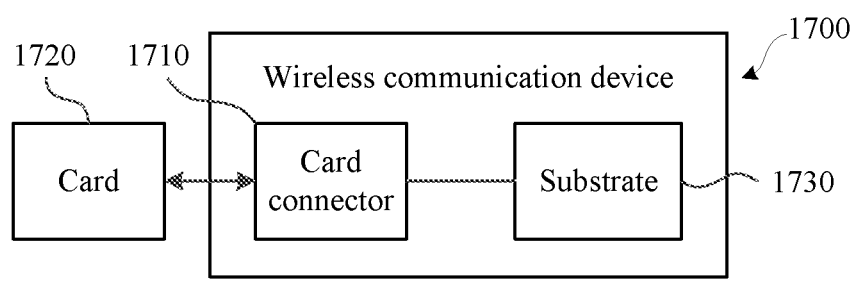
FIG. 17 illustrates a block diagram of a wireless communication device according to one embodiment of the subject matter described herein.

Additionally or alternatively, surfaces of the shielding tray and the shielding sleeve are electrically conductive, and the method may further comprise providing a protrusion arranged on the shielding tray and operable to electrically connect the shielding tray to the shielding sleeve in response to the shielding tray reaching the position of insertion According to another aspect of the embodiments of the subject matter described herein, a wireless communication device 1700 is shown in FIG. 17. The wireless communication device 1700 includes a substrate 1730 and a card connector 1710 as described above in accordance with previous embodiments. The card connector 1710 is mounted to the substrate 1730 in order to operably form data and power transmissions between the card 1720 and the wireless communication device 1700, and the card 1720 is a SIM card.

While operations are depicted in a particular order in the above descriptions, this should not be understood as requiring that such operations be performed in the particular order shown or in sequential order, or that all illustrated operations be performed, to achieve desirable results. In certain circumstances, multitasking and parallel processing may be advantageous. Likewise, while several details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. A card connector comprising:
   a base;
   a shielding sleeve connected to the base, the base and the shielding sleeve defining a first direction for inserting a card and a second direction opposite to the first direction for extracting the card; and a shielding tray for receiving the card, the shielding tray being movable relative to the base in the first direction or the second direction,
wherein the card connector is operable to electrically connect to the card if the card reaches a position of insertion along the first direction.

2. The card connector according to claim 1, further comprising:
an inserting stopper arranged on the base and operable to prevent the shielding tray at the position of insertion from further moving in the first direction.

3. The card connector according to claim 1, further comprising:
a finger-shaped portion arranged on the shielding tray and operable to prevent the card from further moving in the first direction in response to the shielding tray reaching the position of insertion.

4. The card connector according to claim 3, further comprising:
an indented portion arranged on the shielding tray and operable to facilitate a movement of the card relative to the shielding tray in the second direction, the movement of the card being caused by a force applied on the card.

5. The card connector according to claim 1, further comprising:
a detection contact arranged on the base; and
a grounding terminal arranged on the shielding sleeve and electrically connected to an electronic device,
the detection contact being operable to electrically connect to the grounding terminal in response to the shielding tray reaching the position of insertion.

6. The card connector according to claim 5, further comprising:
a detection terminal arranged on the base and electrically connected to the detection contact, such that the grounding terminal is operably connected to the detection terminal in response to the shielding tray reaching the position of insertion.

7. The card connector according to claim 5, wherein surfaces of the shielding tray and the shielding sleeve are electrically conductive, the card connector further comprising:
a protrusion arranged on the shielding tray and operable to electrically connect the shielding tray to the shielding sleeve in response to the shielding tray reaching the position of insertion.

8. A wireless communication device comprising:
a substrate; and
a card connector according to claim 1, wherein the card connector is mounted to the substrate in order to operably form data and power transmissions between the card and the wireless communication device, and the card is a subscriber identity module card.

9. A method of manufacturing a card connector comprising:
providing a base;
providing a shielding sleeve connected to the base, the base and the shielding sleeve defining a first direction for inserting a card and a second direction opposite to the first direction for extracting the card; and
providing a shielding tray for receiving the card, the shielding tray being movable relative to the base in the first direction or the second direction,
wherein the card connector is operable to electrically connect to the card if the card reaches a position of insertion along the first direction.

10. The method according to claim 9, further comprising:
providing an inserting stopper arranged on the base and operable to prevent the shielding tray at the position of insertion from further moving in the first direction.

11. The method according to claim 9, further comprising:
providing a finger-shaped portion arranged on the shielding tray and operable to prevent the card from further moving in the first direction in response to the shielding tray reaching the position of insertion.

12. The method according to claim 11, further comprising:
providing an indented portion arranged on the shielding tray and operable to facilitate a movement of the card relative to the shielding tray in the second direction, the movement of the card being caused by a force applied on the card.

13. The method according to claim 9, further comprising:
providing a detection contact arranged on the base; and
providing a grounding terminal arranged on the shielding sleeve and electrically connected to an electronic device,
the detection contact being operable to electrically connect to the grounding terminal in response to the shielding tray reaching the position of insertion.

14. The method according to claim 13, further comprising:
providing a detection terminal arranged on the base and electrically connected to the detection contact, such that the grounding terminal is operably connected to the detection terminal in response to the shielding tray reaching the position of insertion.

15. The method according to claim 14, wherein surfaces of the shielding tray and the shielding sleeve are electrically conductive, and the method further comprises providing a protrusion arranged on the shielding tray and operable to electrically connect the shielding tray to the shielding sleeve in response to the shielding tray reaching the position of insertion.

* * * * *